SAMPLE CELL FOR DETECTION OF AN ATMOSPHERIC CONTAMINANT
BY INTERNAL REFLECTION SPECTROMETRY
Filed April 11, 1967

INVENTORS
M.G. DREYFUS
E. BLEISTEIN
BY
Frank R. Trifari
AGENT

United States Patent Office 3,515,490
Patented June 2, 1970

1

3,515,490

SAMPLE CELL FOR DETECTION OF AN ATMOSPHERIC CONTAMINANT BY INTERNAL REFLECTION SPECTROMETRY

Marc George Dreyfus, Stamford, Conn., and Edward Bleistein, Queens Village, N.Y., assignors, by mesne assignments, to U.S. Philips Corporation, New York, N.Y., a corporation of Delaware Filed Apr. 11, 1967, Ser. No. 630,033
Int. Cl. G01n *21/16*
U.S. Cl. 356—244 7 Claims

ABSTRACT OF THE DISCLOSURE

Formation of thin liquid films from liquid aerosols by use of thin mesh screen and combination of thin mesh screen and frustrated multiple internal reflection cell as detection device for liquid aerosols and gases.

One aspect of our invention relates to a novel method of forming a thin liquid film on a dimensionally stable element from a liquid aerosol.

According to this aspect of our invention a thin fine mesh metal screen is employed to form, on a dimensionally stable element, a thin liquid film from a liquid aerosol. More particularly, according to our method, the thin metal screen having small apertures but large enough for the aerosol droplets to pass through is positioned at a distance from the dimensionally stable element at a distance such that the aerosol droplets passing through the screen spread out and coalesce to form a thin liquid film contacting both the screen and the dimensionally stable element and the thus positioned screen and dimensionally stable element is brought into contact with the aerosol. The screen may then be removed leaving a thin liquid film on the dimensionally stable element. The screen dimensions and the distance of the screen from the dimensionally stable element depend upon the material of the screen, the material of the dimensionally stable element and the droplet size of the aerosol among other factors. However, generally a screen having a thickness of less than 100$\mu$, aperture dimensions of .1–100$\mu$ and a metal width of about 10–100$\mu$ may be employed. For good results the screen thickness should be about 1–10$\mu$ and the aperture dimensions should be 0.1–10$\mu$, best results being achieved at 1$\mu$. The screen should be held at a distance of from .1–100$\mu$ from the dimensionally stable element, good results being achieved at a distance of 0.1–10$\mu$ and best results being achieved at a distance of about 1$\mu$.

The screen may be made of any suitable metal, examples being copper, gold, nickel, palladium, platinum, platinum plated iron and palladium plated iron, the choice of the particular metal depending upon the dimensions of the screen, the nature of the aerosol as well as other physical chemical considerations. Examples of liquids that may be spread are ethanol, methanol, triethyl phosphate, water and dimethyl methyl phosphonate with the liquid film.

The dimensionally stable element may be another screen having dimensions similar to that of the aforementioned screens or it may be a member having a solid surface and any desirable configuration. Thus the member may be rectangular shaped, plate shaped, cylinder shaped or sphere shaped. The member having the solid surface may be made of such materials as glass, porcelain and other ceramic materials and metals such as germanium, tin and aluminum.

2

Another aspect of this invention relates to an improved multiple reflection optical device. More particularly this aspect of our invention relates to an improved optical device for obtaining optical spectra of liquid aerosols or gaseous contaminants in the atmosphere by the frustrated multiple internal reflection technique.

The use of frustrated multiple internal reflection (FMIR) cells for internal spectroscopy is described in detail in the articles by N. J. Harrick in Annals of the New York Academy of Sciences, volume 101, article 3, pages 928–959 and in Analytical Chemistry, volume 36, No. 1 pages 118 to 191, January 1964, the contents of which articles are hereby incorporated by reference.

In the known method, infrared radiation is focussed on the surface of a multiple reflection cell upon which the sample to be analyzed is deposited. By the use of a spectrometer the percentage of absorption or transmission by the sample is measured through narrow chosen frequency ranges. A plot of transmission or absorption values versus frequency constitutes the infrared spectrum characteristic of the sample and may be used when measured against infrared spectra of known materials as a means of identifying the sample.

Such a multiple reflection cell is illustrated in FIG. 3, page 190 of the above-noted Analytical Chemistry article and its use in the analysis of a sample is described on pages 944–948 of the above-noted Academy of Sciences article.

When dealing with low-concentration liquid aerosols with droplet diameters greater than one micron it has been found that the FMIR cells that have heretofore been employed are sometimes not sufficiently sensitive to provide an adequate spectrum of the sample. This lack of sensitivity has been found to result from the fact that the aerosols may deposit upon the cell surface in the form of discrete droplets covering only a small fraction of the cell surface to a depth of many microns. Consequently the radiation transmitted through the cell surface only passes through the bottom micron of the deposited liquid and the overlying liquid is undetected.

According to our invention we have solved these problems by attaching a thin fine metal mesh screen positioned about 1 micron from and substantially parallel to a surface of the FMIR cell which is to be used to detect an aerosol sample. The screen is provided with mesh sizes large enough to allow the aerosol droplets to pass through but too small to permit dust or other solid particles from coming in contact with the cell surface. By this means a micron thick uncontaminated film of the liquid component of the aerosol is spread over the surface of the cell.

While the size of the openings and diameter of the wire mesh may vary considerably, we have found that good results are achieved by having sieve openings of from about 1 to 10 microns and by making the screen 1 to 10 microns thick. The screen is preferably made of metal. Examples of metals that may be employed are copper, gold, nickel, palladium, platinum and platinized iron.

The screen may be manufactured by a photoetching process from a thin sheet of metal or it may be electrodeposited on an engraved master.

A typical FMIR cell may be formed of germanium. Other materials known for the manufacture of such cells may also be employed.

The screen may be held in a parallel position in regard to the cell surface by being stretched taut between metal shims each 1 micron thick secured to the edges of the cell surface.

As stated supra, the combination of screen and FMIR cell of our invention may be used to detect gaseous contaminants in the atmosphere.

For this purpose we employ a thin metal screen having apertures large enough for the gaseous contaminant to pass through but too small for the dust particles to pass through the screen, 1–10$\mu$ giving best results. Here too, the screen should be in a plane substantially parallel to the cell surface.

The screen may be located at about $1/10$ to 100 microns from the cell, about $1/10$–3 microns being most useful.

For gas detection the screen may be made of any suitable metal including those mentioned supra for the detection of aerosols, platinum being particularly suitable. There is no fixed limitation on the thickness of the screen, good results being achieved with a screen of about 1–10 microns thick. Among the gaseous contaminants that may be detected by our device are for example ethanol vapour and dimethyl methyl phosphonate vapour.

According to a preferred embodiment of our invention, we provide the screen with a source of heater current so as to cause the screen to expand away from the cell when electric current is applied to the screen. By this means the film of liquid between the screen and cell is heated and broken and the liquid is quickly removed from the cell.

Our invention will now be described in greater detail with reference to the following examples and to the accompanying drawing in which.

Figure 2:
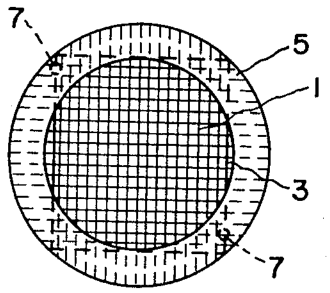
FIG. 2 is a top plan view of the same embodiment shown in FIG. 1.
Figure 1:
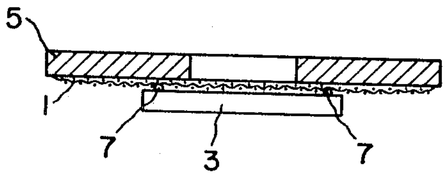
FIG. 1 is a cross sectional view of an embodiment of our invention.

In FIGS. 1 and 2 a circular screen 1 of a diameter of about 3 inches, formed of 5 micron thick nickel sheet and having apertures of 5 microns diameter is held in a plane parallel to, and 1 micron away from the surface of a germanium FMIR cell by annular metal frame 5 and by the 1 micron thick aluminum shims 7 evaporated on the surface of the rectangular cell 3. The shims are glued to the surface of the screen opposing the cell surface.

Figure 3:
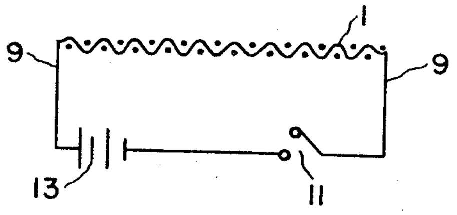
FIG. 3 is a diagrammatic view of a modification of the embodiment shown in FIGS. 2 and 3.

FIG. 3 shows a diagrammatic view of a modification of the screen employed in the structure shown in FIGS. 1 and 2. In this modification the screen 1 may be expanded between metal shims 7 by means of a heater current supplied through conductor wire leads 9 from a source and switch 11 from the battery 13. By this means it is possible to expand the screen so that it no longer lies in a plane parallel to and 1 micron away from the cell surface and the micron thick film of liquid formed between the screen and cell surface is broken and is evaporated from the device.

Figure 4:
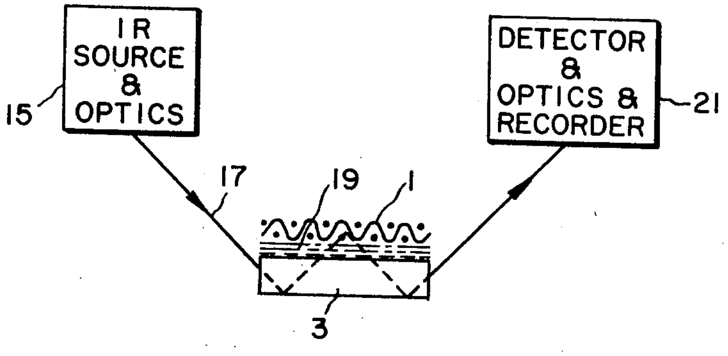
FIG. 4 is a schematic diagram partially in block form showing the operation of our invention.

The operation of our device is schematically illustrated in FIG. 4.

As shown, the apparatus comprises an infrared source 15 for generating a beam of infrared radiation 17, 3 is a germanium FMIR cell such as shown in FIGS. 1 and 2, 1 is a screen shown in FIGS. 1 and 2, 19 is a 1 micron thick liquid film formed from the aerosol liquid and lying on the surface of the FMIR cell 3 and 21 is a detector for measuring and recording the intensity of the infrared radiation transmitted by the FMIR cell. Not shown is a monochromator for selectively scanning the infrared radiation transmitted by the FMIR cell. verses wavelength characteristic of the spectrum.

The apparatus illustrated in FIG. 4 may be used as follows:

The FMIR cell 3 and screen 1 combination is exposed to an atmosphere containing a liquid aerosol such as a triethyl phosphate aerosol the droplets of which are about 50 microns in diameter. A droplet impinging on the screen 1 is spread to form a micron thick liquid film 19 in contact with the surface of the FMIR cell 3.

Infrared radiation 17 of the 8–10 micron band region developed in the infrared source 15 enters the germanium FMIR cell 3. The germanium cell is in the form of a flat slab, the dimensions of which are about 50 x 10 x 1 mm. The infrared radiation is reflected by the cell and penetrates the entire thickness of the liquid film and is reflected back into the cell. After about 35 reflections, the exciting infrared radiation is detected and the infrared absorption spectrum recorded in recorder (21).

The apparatus (21) shown in FIG. 4 may employ a Perkin-Elmer spectrometer (Model 12a monochromator) with a NaCl prism in conjunction with the screen FMIR cell of our invention which is employed as a light pipe.

It should be noted that the spectrometer optics can vary widely and are not limited to the specific arrangements illustrated or described. Any of the well known types of FMIR cell may be employed. Thus, single, double or higher order pass cells can be employed.

Thus, for example, the double-pass cells described on page 190 of the aforementioned January 1964 Analytical Chemistry article are very suitable. Besides germanium, the cell may be formed of silicon or Irtran or other radiation-transmitting materials. Further, in place of aluminum shims, other metal shims such as silver or other suitable metal shims or a solder joint may be employed.

The means for recording the spectrum are well known in the art and needn't be further described.

The aspect of the invention relating to the method of coating a dimensionally stable element is demonstrated by the following example:

EXAMPLE

A 200 mesh nickel screen, 70% open and 5 microns thick was held by a clamping device 1 micron from a flat glass slide. An aerosol containing ethanol droplets of about 100$\mu$ average diameter was sprayed by an atomizer on the screen surface away from the glass slide. Droplets of the ethanol that impinged on the screen surface rapidly passed through the screen apertures and spread on the glass slide. Removal of the screen showed a thin film of ethanol remaining on the glass slide.

While we have described our invention in connection with specific embodiments and applications, other modifications thereof will be readily apparent to those skilled in this art without departing from the spirit and scope of the invention as defined by the appended claims.

What we claim is:

1. A device for the detection of an atmospheric contaminant by internal reflection spectrometry said device comprising a frustrated multiple internal reflection cell having an exposed surface, a fine mesh metal screen having apertures large enough to permit the passage through the screen of discrete particles of said contaminant but too small to allow the passage through the screen of most dust particles and means for holding said screen in a fixed position about $1/10$ to 100 microns from said exposed surface in a plane substantially parallel to said surface said screen having aperture dimensions of .1–100$\mu$, a thickness of less than 100$\mu$ and a metal width of about 10–100$\mu$.

2. The device of claim 1 wherein the contaminant is a gas, the dimensions of the screen apertures range from 1–10$\mu$ and the distance of the screen from the cell being about $1/10$–3$\mu$.

3. The device of claim 1 wherein the contaminant is a liquid aerosol and the distance of the screen from the cell is about 1$\mu$.

4. The device of claim 3 wherein the screen is about 1–10$\mu$ thick and the dimensions of the screen apertures are about 1–10$\mu$.

5. The device of claim 1 wherein the screen is formed of a metal selected from the group consisting of copper, nickel, gold, platinum, palladium, platinum plated iron and palladium plated iron.

6. The device of claim 3 wherein there is heating means connected to the screen for causing the screen to expand away from the thin liquid layer to facilitate removal of said liquid layer from said device.

7. The device of claim 6 wherein the means for heating the screen comprises a source of electric heater current and means electrically connecting said source of heater current to said screen.

References Cited

UNITED STATES PATENTS

| | | | |
|---|---|---|---|
| 3,420,138 | 1/1969 | Hansen | 356—74 |

RONALD L. WIBERT, Primary Examiner

V. P. McGRAW, Assistant Examiner

U.S. Cl. X.R.

356—256

PO-1050 (5/69)

UNITED STATES PATENT OFFICE

CERTIFICATE OF CORRECTION

Patent No. 3,515,490 (PHA 20,465) Dated June 2, 1970

Inventor(s) MARC GEORGE DREYFUS ET AL

It is certified that error appears in the above-identified patent and that said Letters Patent are hereby corrected as shown below:

Column 2, line 12, "118" should read -- 188 --.

Column 3, line 69, "radiation transmitted by the FMIR cell" should read -- spectrum to obtain the desired absorption --.

Signed and sealed this 2nd day of march 1971

(SEAL)
Attest:

Edward M. Fletcher, Jr.
Attesting Officer

WILLIAM E. SCHUYLER, JR.
Commissioner of Patents